July 19, 1932.    R. CHILTON    1,868,346
ENGAGING AND DRIVING MECHANISM FOR ROTARY PARTS
Filed Jan. 24, 1931    3 Sheets-Sheet 2

INVENTOR
Roland Chilton
BY
Newell & Spencer
ATTORNEYS

July 19, 1932. R. CHILTON 1,868,346
ENGAGING AND DRIVING MECHANISM FOR ROTARY PARTS
Filed Jan. 24, 1931 3 Sheets-Sheet 3
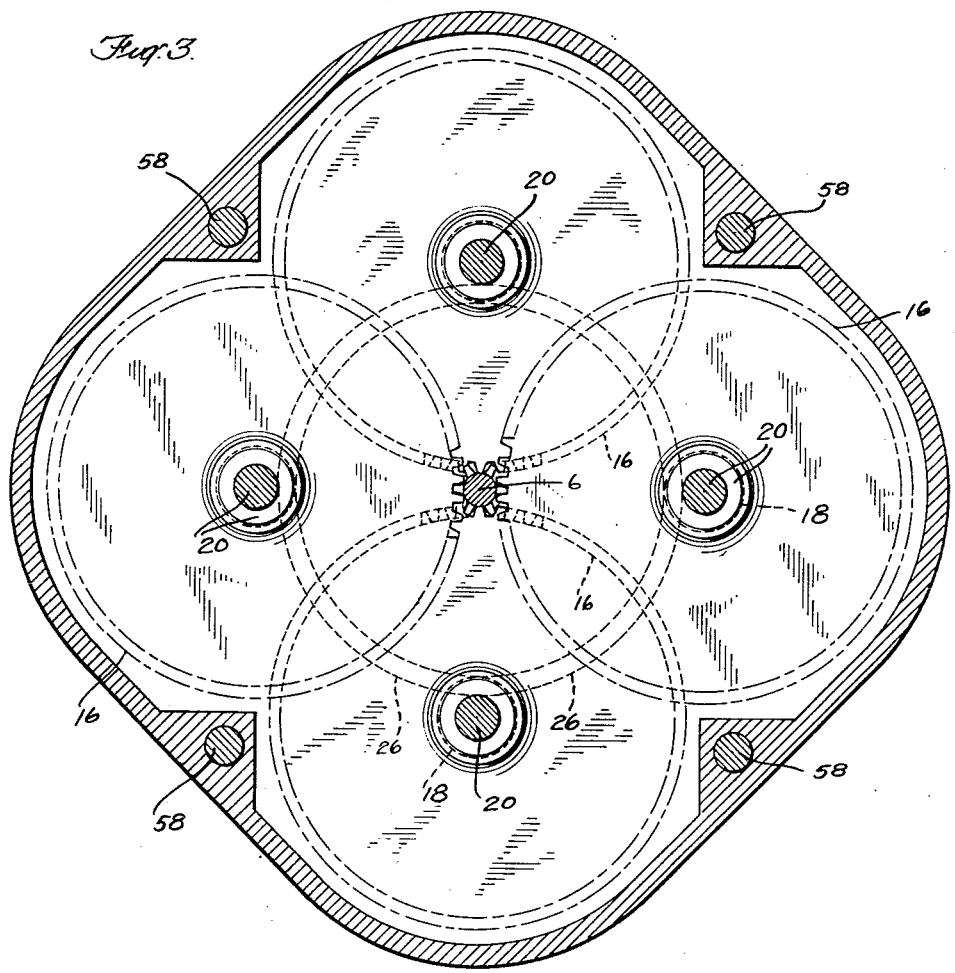
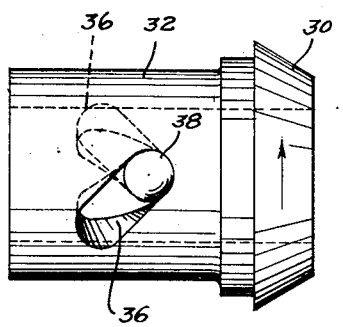
Fig. 4.
INVENTOR
Roland Chilton
BY
ATTORNEYS Patented July 19, 1932

1,868,346

UNITED STATES PATENT OFFICE

ROLAND CHILTON, OF RIDGEWOOD, NEW JERSEY

ENGAGING AND DRIVING MECHANISM FOR ROTARY PARTS

Application filed January 24, 1931. Serial No. 510,883.

This invention relates to engaging and driving mechanisms for rotary parts and more particularly to a novel mechanism whereby driving and driven members may be automatically engaged and disengaged.

One object of the invention is to provide a one-way driving connection which will act automatically to take up the back-lash characteristic of certain driving mechanisms of the prior art when one member overruns the other.

Another object of the invention is to provide a mechanism by which practically instantaneous engaging action responsive to the initiation of rotation from a driving member is secured whereby a full engagement may be effected before the driving member has acquired substantial rotation as to time, distance, speed or momentum.

Other objects of the invention are to provide a simple and effective mechanism for eliminating shock produced by back-lash, lost motion, or delayed engagement occurring in automatic meshing devices of the prior art.

The invention is particularly applicable to the driving or meshing mechanisms for starting devices for hydrocarbon engines, and the invention is shown in this application as embodied in such a starting device.

In the starting devices for hydrocarbon engines of the prior art, the well-known screw-shift device is, at present, the most widely used means for securing automatic engagement after the driving member has started to rotate, and disengagement when the engine starts under its own power. Shock-absorbing devices such as spring elements in the driving mechanism or a clutch which is capable of slipping under excess load, are used with the present screw-shift devices for the following reasons:

(a) Electric starting motors accelerate with extreme rapidity when the control switch is closed and attain considerable speed and momentum before the driving pinion or other meshing member attains its position. This is true even though the shift device is mounted directly upon the motor shaft. When reduction gears are interposed between the motor shaft and the shift device, the motor may make many turns before complete engagement of the meshing parts. Furthermore, on aircraft engines the three-tooth starter jaw has become standardized as the member to be engaged, this jaw being arranged to engage a corresponding three-tooth member mounted on the engine shaft. With this starter jaw connection, in addition to the lost motion of the meshing device, the starter jaw may under certain conditions require a rotation of one-third of a turn before complete engagement with cooperating jaw. Gear ratios of 100 to 1 are employed and, in addition to the rotation of the motor during the lost motion of the screw shift device, this possible lost motion of the starter jaw will give over thirty turns of the motor during which the motor is free to run away before engagement takes place. The result is that when full engagement of the meshing devices occurs, the motor may be rotating at thousands of revolutions per minute. The resulting momentum of the motor armature would be highly destructive in the absence of the yielding connections of the prior art.

(b) During the driving of the engine shaft by the starter, the engine shaft often overruns the starter, as immediately after passing a high compression point or under an isolated firing impulse before the engine starts under its own power. These actions usually accelerate the engine much faster than the starter can follow, and the resumption of the drive by the starter tends to produce a heavy shock on the parts which must be absorbed by the yielding connections. This is particularly true when the engine is accelerated by an isolated firing impulse and rocks back after the impulse is spent. In this case the engine may actually back up against the rapidly accelerating starter.

(c) The overrunning of the starter by the engine and the resumption of the drive by the starter often completely demeshes and remeshes the meshing devices of the prior art, giving a bumping action known as "hunting" which results in severe stress on the mechanism even when shock-absorbing devices are employed.

(d) "Back-fires" from advanced ignition do not in general develop greater loads than the maximum starting effort required under certain conditions. A back-fire however, often occurs after an overrun of the engine after passing a compression peak and any back-lash then results in a rocking back of the engine with exceptional violence against the starter.

Another important object of the present invention is to produce a driving mechanism of a character which may be applied with advantage to engine starting devices and which will eliminate lost motion resulting in the tendency to produce the severe shocks on the parts of the mechanism above briefly pointed out.

In accomplishing this object, applicant has produced a meshing mechanism in which the engagement of the parts is practically instantaneous and in which the driving means automatically follows up any acceleration of the engine during the operation of the starter. In the present construction the driving device automatically resumes the drive substantially at the instant when the driven element, after overrunning the driving element, comes back to the speed of the driving element, thus forestalling any reverse rotation of the driven element.

The invention may be applied to various types of meshing members. The invention disclosed in this application is embodied in a driving mechanism for engine starting devices having the standard three-tooth starter jaw, and one of the objects of the invention is to overcome the lost motion occurring under certain conditions above set forth, which characterizes this type of starter jaw. The construction by which this object is accomplished enables this standard type of jaw to be employed.

It appears that de-meshing action under temporary overrun is an inherent characteristic of devices like the screw-shift in which the driving torque is taken by the shifting means. In this type of mechanism when the driven member overruns the driving member under an impulse of short duration, the driving and driven elements are de-meshed and the remeshing of these elements and the resumption of the drive causes the objectionable shocks on the parts of the mechanism referred to above. In such mechanisms, the shift pressures are directionally proportional to the driving pressures and when an accidental corner-contact of the meshing parts occurs, this results in heavy axial loads. For this reason special anti-jamming devices are usually incorporated in such mechanisms.

A further object of the present invention is to provide a driving mechanism of the character described in which this de-meshing action on an overrun is avoided.

Another object of the invention is to provide a drive mechanism which will avoid under any circumstances the production of these high axial pressures.

In carrying out these objects, a mechanism has been produced in which the shifting and driving functions are performed by separate mechanisms.

Other objects of the invention are to improve the construction and mode of operation of engaging and driving devices of the character described and to produce a drive mechanism of this general character, which is simple in construction, light and compact, and may be manufactured at a relatively low cost, particularly as compared with prior mechanisms.

With the above and other objects in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Fig. 3 is a sectional view taken substantially on the line 3—3 of Fig. 1;

Fig. 4 is a detail view in elevation illustrating certain parts of the shift mechanism.

Figure 1:
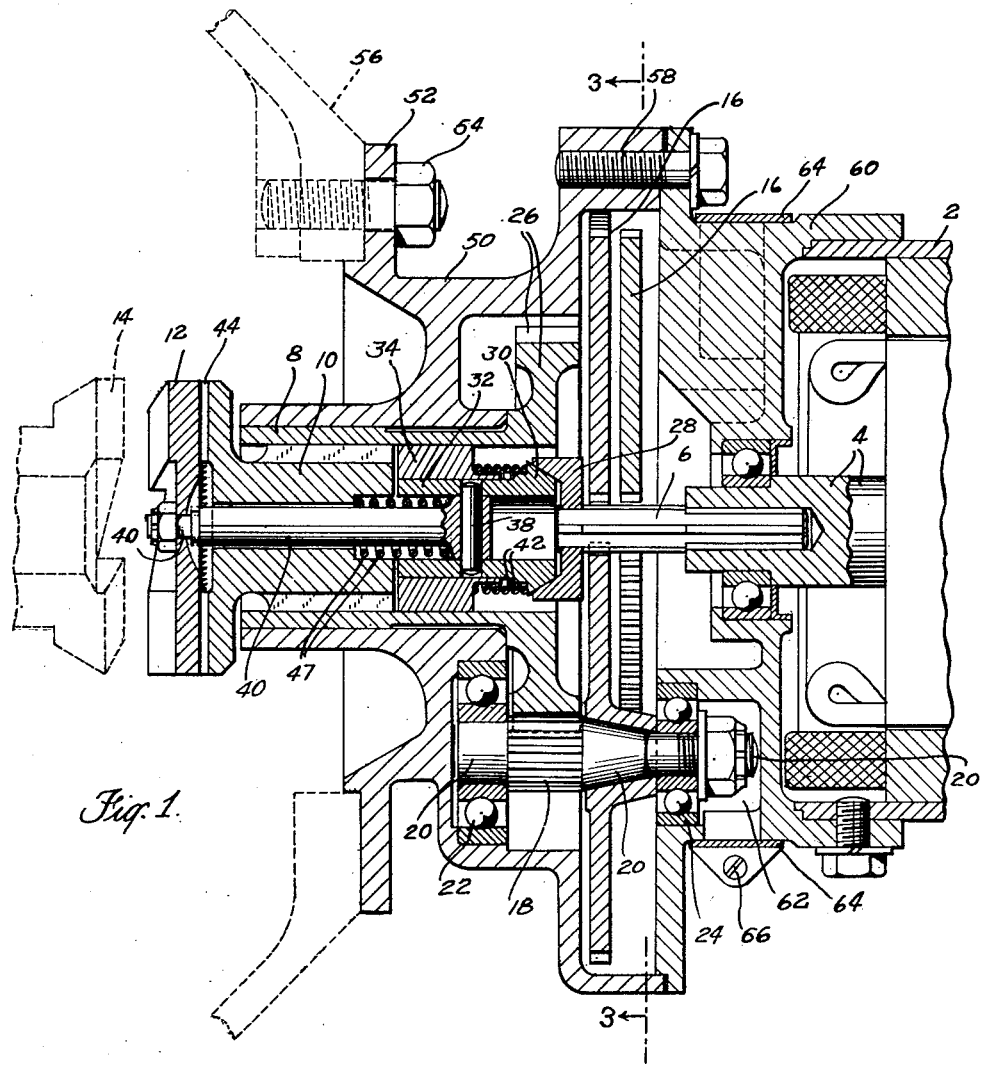
Fig. 1 is a view in axial section illustrating a mechanism embodying the invention.
Figure 2:
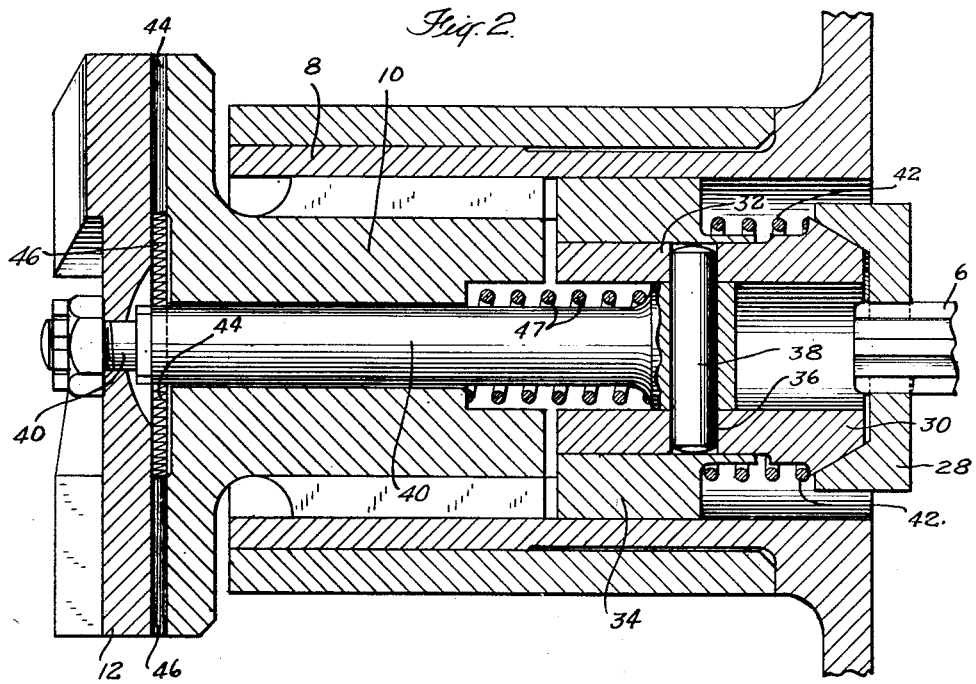
Fig. 2 is a detail view in axial section illustrating certain of the parts shown in Fig. 1 on an enlarged scale.
Figure 5:
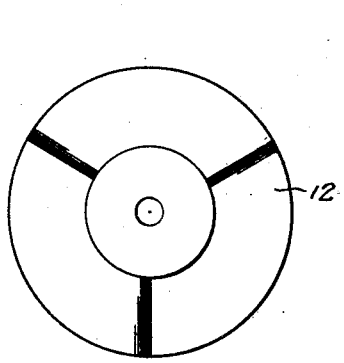
Fig. 5 is a detail view in end elevation illustrating the engine engaging jaw of the starting mechanism.
Figure 6:
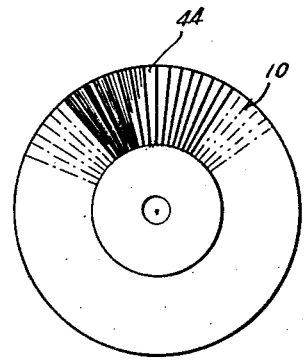
Fig. 6 is a detail view in end elevation illustrating one end of a ratchet clutch sleeve for driving the engine engaging member.

In the drawings, the invention as illustrated is embodied in a starting mechanism for hydrocarbon engines. This starting mechanism comprises an electric motor 2 having an armature shaft 4 in which is secured a small high speed driving pinion 6. This pinion is arranged to drive at low speed through a high ratio gear train, a sleeve 8 within which is keyed to slide longitudinally thereof, a slow speed ratchet clutch sleeve 10. This clutch sleeve is connected through a ratchet clutch with an engine-engaging jaw 12 arranged to engage the starting jaw 14 mounted on the crankshaft of the engine.

The high ratio gear train through which the driving sleeve 8 is driven from the pinion 6, comprises a series of gears 16 preferably of substantially the same diameters and each meshing with the pinion 6. The gears are arranged in pairs, the gears of each pair lying in the same plane, with the gears of one pair overlapping the gears of the other pair, as shown clearly in Fig. 3. As shown in Fig. 1, the pairs of gears are offset longitudinally of the pinion 6.

Each of the gears 16 is secured to a small gear or pinion 18 preferably formed integral with a countershaft 20, the ends of which are supported in antifriction bearings 22 and 24 in the frame of the mechanism. Each of the pinions 18 meshes with a gear 26 secured to the sleeve 8. The gear trains employed in the present starter mechanism may be such as to give a gear ratio as high as 100 to 1 between the driving pinion and gear 26 and the clutch sleeve 10.

The engine-engaging jaw 12, when the starter is out of operation, is held out of engagement with the jaw 14 on the engine shaft, as shown in Fig. 1. Upon starting the motor, the engine-engaging jaw is practically instantaneously moved axially into engagement with the jaw 14. The mechanism for effecting this result comprises a friction clutch member 28 mounted on one end of the driving pinion 6 and a cooperating friction clutch member 30 fixed to a sleeve 32 mounted to rotate in a bearing-block 34 located within the driving sleeve 8. Within the sleeve 32 are formed diametrically arranged cam slots 36 (see Fig. 4) inclined to the axis of said sleeve in which engage the ends of a pin 38 secured within one end of a longitudinally movable rod 40 passing centrally through the sleeve 10. To the opposite end of this rod is secured the engine-engaging jaw 12, the latter jaw being supported by the rod. The sleeve 32 is acted upon by a relatively light coiled spring 42 interposed between the bearing block 34 and the clutch member 30 which holds said clutch member constantly in light engagement with the clutch member 28.

The ratchet clutch for connecting the clutch sleeve 10 with the engine-engaging jaw 12 comprises a series of fine ratchet teeth 44 formed on a flange on said clutch sleeve and arranged to engage a corresponding series of teeth 46 formed on the rear side of engine-engaging jaw 12. The rod 40 and the ratchet clutch sleeve are acted upon by a coiled spring 47 interposed between said sleeve and an enlargement on the rod which tends to force said sleeve and rod in opposite directions and maintains the ratchet teeth 44 in contact with the ratchet teeth 46.

The mechanism described has the following mode of operation: Starting with the motor de-energized and the engine-engaging jaw 12 disengaged from the jaw 14, and with the ends of the pin 38 engaging in the right hand ends of the slots 36, as shown in Fig. 4, when the motor 2 is energized, the initial rotation of the pinion 6 drives at high speed the clutch member 28 of the friction clutch, and also the clutch member 30 and clutch sleeve 32 for a small part of a revolution. The clutch sleeve 32 drives the rod 40, the clutch sleeve 10 and the engine-engaging jaw 12 thru the pin 38, and tends to drive these parts at high speed. The clutch sleeve 10, however, is held to slow speed rotation thru the reduction gear train and the friction clutch tends to drive the jaw 12 ahead of said sleeve. This tendency of the engine-engaging jaw 12 to be rotated by the friction clutch ahead of the clutch sleeve 10 is lightly resisted by the contact of the ratchet teeth 46 on said jaw with the ratchet teeth 44 on the clutch sleeve 10, these teeth being held in engagement by the action of the coiled spring 47. This resistance causes a movement of the pin 38 toward the left-hand ends of the cam slots 36 which results in an endwise movement of the rod 40 toward the left (Fig. 1). This promptly meshes the jaw 12 with the jaw 14, and when the projecting faces of the jaws engage, the clutch members 28 and 30 slip, the pinion 6 and clutch member 28 continuing to rotate at high speed. When the projections on the jaws 12 and 14 engage, the starting drive is effected through the fine ratchet teeth 44 and 46 from the sleeve 10 which is driven from the pinion 6 at slow speed through the reduction gear train. When the engine starts under its own power, the current through the electric motor is cut off and the engine jaw 14 overruns the jaw 12 and the latter jaw is thrown out of mesh with the jaw 14 by the sloped formation of the rear faces of the projections on these jaws. This forces the pin 38 back into the right-hand ends of the inclined slots 36. When the motor armature and the reduction gear train come to rest, the engine-engaging jaw 12 is retained in retracted or demeshed position by the friction between the clutch members 28 and 30 which resists the relative rotation of the sleeve 32 and the rod 40 required for axial movement of the rod and the engine-engaging member 12.

Meshing engagement of the starter jaw 12 with the engine jaw 14 is thus produced by the high speed shaft of the starter and will therefore be many times as prompt as with the meshing devices of the prior art which are actuated from the slow speed shaft. During the starting operation, when the jaw 12 is in engagement with the jaw 14 to drive the latter jaw, the jaw 12 rotates at the slow speed of the driving sleeve 8 to drive the engine crank shaft. The pin 38 is then located with its ends in the left-hand ends of the slots 36 and the friction clutch member 28 tends to rotate the friction clutch member 30, the rod 40 and the engine-engaging jaw 12 at high speed, rotation of these parts at high speed being prevented only by the engagement of the teeth of jaw 12 with the cooperating teeth of the engine jaw 14. When the engine crank shaft, prior to the full starting of the engine, is accelerated beyond the slow speed of the driving sleeve 8, as often occurs when the engine passes a compression peak, or after an isolated firing impulse, the jaw 12 follows up the accelerated movement of the jaw 14 under the influence of said high speed friction driving clutch member 28 from which said jaw is driven under these conditions. With the present construction, there is no possibility that any reverse or backward movement of the jaw 14 can occur. When the jaw 14 after any acceleration starts to slow down, the projections on the jaw 12 will continue in engagement with the projections on the jaw 14 and the jaw 12 will slow down therewith until both these members are rotating at the same speed as the speed of the clutch sleeve 10. When this occurs the clutch sleeve 10 resumes the drive through the coaction of the fine ratchet teeth 44 and 46.

It will be seen that, because of the torque exerted on the friction clutch sleeve 32 tending to turn said sleeve faster than the normal speed of rotation of the rod 40 and jaw 12, during starting, a resultant continuous meshing pressure is exerted on the jaw 12 which is thus lightly urged to remain in mesh. This jaw is also urged lightly to rotate at the high speed of the driving pinion 6. In cases in which the gear reduction ratio employed in the starter is 100 to 1, the starter jaw 12 will be urged to rotate 100 times as fast as the driving sleeve 10. Thus the starter jaw 12 will follow up any erratic acceleration of the engine during starting and any abortive start, whereby separation and back-lash of the teeth on the jaws 12 and 14 is prevented until the engine has reached substantially the high speed of the driving pinion 6. When the engine reaches this speed, it is assured that the engine has been started. Upon the starting of the engine the starter is "switched off" and the demeshing of the starter jaw 12 from the engine jaw 14 is automatically effected by the sloped formation of the teeth.

Thus the engagement of the starter jaw 12 with the engine jaw 14 is produced by the high speed shaft of the starter and this action is many times as rapid or prompt as with the meshing devices of the prior art which are actuated from the slow speed shaft, the rapidity of the action depending upon the speed ratio employed in the starter. In starters in which the speed ratio is 100 to 1 the speed of this action will be substantially 100 times the speed of the corresponding action produced by the slow speed shaft.

It will be evident that, with this construction and mode of operation of the parts, the back-lash and resultant shock produced in prior constructions is eliminated. In the present construction, a simple and compact starter meshing device is provided with which no special shock-absorbing devices are required.

The sleeve 8 which carries the gear 26 is mounted in a bearing in a housing 50 having a peripheral flange 52 which is secured by bolts 54 to a portion 56 of the casing of the engine to which the starter is applied. Secured to the casing or housing 50 by bolts 58 is a cover member 60 which constitutes a supporting member for the motor. The bearings 22 and 24 for the respective shafts 20 are mounted respectively in the casing 50 and the cover member 60, as shown in Fig. 1, and the cover member is provided with a series of recesses 62 into which the ends of the shafts 20 project. Nuts 20 are threaded on the shafts for securing the gears 16 to the shafts. This construction enables access to be gained to these nuts for the purpose of adjustment of the parts. The several recesses are covered by means of a band 64 extending about the cover member 60, the ends of which are secured together by means of a bolt 66.

It is to be understood that except as defined in the claims, the invention is not limited to the particular construction and arrangement of parts of the illustrated embodiment of the invention, but that the invention may be embodied in other forms within the scope of the claims.

Having explained the nature and object of the invention, and having specifically described a construction embodying the invention in its preferred form, what is claimed is:

1. In an engine starter, a driven shaft, a power shaft, reduction gearing for driving the driven shaft from the power shaft, an engine-engaging member, a clutch for connecting the engine-engaging member with the driven shaft constructed to enable said engine-engaging member to overrun the driven shaft, and automatic meshing means associated with said power shaft and tending to produce said overrun.

2. In an engine starter, a high speed shaft, a low speed shaft, gearing connecting said shafts, an engine-engaging member arranged to drive the engine from the low speed shaft and means for causing said member to be driven at relatively high speed to follow any acceleration of the engine.

3. An engine starter comprising in combination a high speed shaft, a low speed shaft, an engine driving member driven positively from the low speed shaft, and a yielding driving connection between said member and the high speed shaft for driving said member at relatively high speeds.

4. In a starter, a high speed shaft, a low speed shaft, an engine-engaging member positively driven by the low speed shaft, and means tending to cause said member to overrun said low speed shaft to follow any acceleration of the engine.

5. In a starter mechanism, in combination, a drive shaft, an engine-engaging member, a positive driving connection therebetween constructed to allow ocerrun of said member relative to the shaft, and means constantly tending to produce said overrun during an engine starting operation.

6. In a starter, in combination, a drive shaft, an engine-engaging member, means for connecting said member with the shaft constructed to prevent rotation of said member at less speed than the shaft, and yielding driving means for urging said member to overrun the shaft.

7. In a starter for an engine having a starting member provided with widely spaced engageable teeth, a starter shaft member having relatively finely spaced teeth, an intermediate member having sets of teeth respectively spaced widely and finely for respective engagement with the teeth on said starting member and the teeth on said starter shaft member, and yielding means urging said intermediate member to follow up an overrun of the engine relatively to the starter shaft member.

8. In a starter mechanism having complementary starter and engine members constructed for overrun of the engine member by the starter member and thereafter subject to back-lash, the combination of a starter drive shaft, a one-way driving connection between said shaft and the starter member, and means to maintain said starter member in contact rotationally with said engine member when the engine overruns the starter drive shaft.

9. The combination with an engine member and an engine drive member having a relatively large amount of back-lash, of means for driving said engine drive member comprising a one-way driving connection having a relatively small amount of back-lash, and means to maintain said members in contact during erratic accelerations of the engine while being started.

10. In combination with an engine member and an engine-engaging member having a construction allowing a relatively large amount of lost motion, of means for driving said engine-engaging member comprising a one-way driving connection substantially free of lost motion, and yielding means to maintain driving engagement between said members until the engine is fully started.

11. The combination with a starter shaft, of a driven member, a mesh member engageable with said driven member, and automatic meshing means tending to advance said mesh member faster than the rotation of the shaft.

12. In a device of the class described, a mesh member, driving means for said mesh member, and means constructed and arranged to advance rotationally said mesh member relatively to the driving means.

13. The combination with a drive shaft, of an engine-engaging member, a one-way drive connection between said shaft and said member, and automatic means tending to advance said member rotationally with relation to the shaft.

14. The combination with a starter drive shaft, of an engine-engaging member connected to said shaft for movement axially of the shaft and for rotational movement ahead of said shaft, and means to produce said movements.

15. The combination, in a starter, of high and low speed shafts, means operated from the high speed shaft for effecting engagement of the starter with the engine, and means operated from the low speed shaft for driving the engine.

Signed at New York, New York this 20th day of January 1931.

ROLAND CHILTON.

DISCLAIMER 1,868,346.—*Roland Chilton*, Ridgewood, N. J. Engaging and Driving Mechanism for Rotary Parts. Patent dated July 19, 1932. Disclaimer filed January 16, 1933, by the patentee.

Hereby disclaims from the scope of claim 15 of the above-named patent all starter mechanisms except those in which the driving means is caused to follow up, at relatively high speed, any acceleration of the engine during starting.

[*Official Gazette January 31, 1933.*]